(12) United States Patent
Higashi et al.

(10) Patent No.: US 10,641,871 B2
(45) Date of Patent: May 5, 2020

(54) AREA SENSOR AND EXTERNAL STORAGE DEVICE

(71) Applicant: HOKUYO AUTOMATIC CO., LTD., Osaka-shi, Osaka (JP)

(72) Inventors: Toshiya Higashi, Takatsuki (JP); Santosh Wagle, Osaka (JP)

(73) Assignee: HOKUYO AUTOMATIC CO., LTD., Osaka-shi (JP)

( * ) Notice: Subject to any disclaimer, the term of this patent is extended or adjusted under 35 U.S.C. 154(b) by 0 days.

(21) Appl. No.: 15/764,153

(22) PCT Filed: Oct. 19, 2016

(86) PCT No.: PCT/JP2016/080928
§ 371 (c)(1),
(2) Date: Mar. 28, 2018

(87) PCT Pub. No.: WO2017/073423
PCT Pub. Date: May 4, 2017

(65) Prior Publication Data
US 2018/0275253 A1 Sep. 27, 2018

(30) Foreign Application Priority Data
Oct. 27, 2015 (JP) ................................. 2015-210602

(51) Int. Cl.
*G01S 17/00* (2020.01)
*G01S 7/00* (2006.01)
(Continued)

(52) U.S. Cl.
CPC .............. *G01S 7/4861* (2013.01); *G01S 7/48* (2013.01); *G01S 17/42* (2013.01); *G05D 1/02* (2013.01); *G01S 17/93* (2013.01); *G01S 17/931* (2020.01)

(58) Field of Classification Search
None
See application file for complete search history.

(56) References Cited

U.S. PATENT DOCUMENTS 4,790,402 A * 12/1988 Field .................... G05D 1/0238
180/169
6,321,172 B1 11/2001 Jakob et al.
(Continued)

FOREIGN PATENT DOCUMENTS

DE 102 11 941 A1 10/2003
EP 1 033 556 A1 9/2000
(Continued)

OTHER PUBLICATIONS

Jan. 24, 2017 Search Report issued in International Patent Application No. PCT/JP2016/080928.
(Continued)

*Primary Examiner* — Kara E. Geisel
*Assistant Examiner* — Jarreas C Underwood
(74) *Attorney, Agent, or Firm* — Oliff PLC (57) ABSTRACT

An area sensor includes: a sensor unit that emits measurement light with which a monitoring area is scanned, and detects reflected light of the measurement light; and a system controller that controls the sensor unit to output sensor information to an external device, the sensor information including object information in the monitoring area obtained based on an output signal from the sensor unit, the system controller including: a memory interface to which a portable external storage device is connectable, a sensor controller that controls the sensor unit, and a memory controller that accesses the external storage device; and a start processing unit which operates the memory controller in priority to the system controller, when the external storage device is connected to the memory interface.

16 Claims, 7 Drawing Sheets

(51) Int. Cl.
*G01S 7/4861* (2020.01)
*G01S 17/42* (2006.01)
*G05D 1/02* (2020.01)
*G01S 7/48* (2006.01)
*G01S 17/931* (2020.01)
*G01S 17/93* (2020.01)

(56) References Cited

U.S. PATENT DOCUMENTS

| | | | | |
|---|---|---|---|---|
| 6,363,164 | B1* | 3/2002 | Jones | G06K 9/033 |
| | | | | 382/135 |
| 7,647,591 | B1* | 1/2010 | Loucks | G06F 9/4831 |
| | | | | 710/264 |
| 9,188,441 | B2* | 11/2015 | Munroe | G01C 15/006 |
| 9,328,548 | B2* | 5/2016 | Shiraishi | E05F 15/77 |
| 9,921,584 | B2* | 3/2018 | Rao | G05D 1/0246 |
| 2002/0062390 | A1* | 5/2002 | Tajima | H04L 12/5692 |
| | | | | 709/244 |
| 2004/0212835 | A1* | 10/2004 | Neff | H04N 1/3873 |
| | | | | 358/1.18 |
| 2004/0230488 | A1* | 11/2004 | Beenau | G06Q 20/3278 |
| | | | | 705/18 |
| 2005/0055547 | A1* | 3/2005 | Kawamura | G06F 21/31 |
| | | | | 713/155 |
| 2006/0016870 | A1* | 1/2006 | Bonalle | G06K 19/07 |
| | | | | 235/380 |
| 2007/0094322 | A1* | 4/2007 | Peev | H04L 67/1095 |
| | | | | 709/202 |
| 2008/0074637 | A1* | 3/2008 | Kumagai | G01C 15/002 |
| | | | | 356/4.01 |
| 2009/0027227 | A1* | 1/2009 | Wilson | E21B 47/12 |
| | | | | 340/853.2 |
| 2009/0070599 | A1* | 3/2009 | Nishimura | G06Q 20/341 |
| | | | | 713/193 |
| 2009/0091447 | A1* | 4/2009 | Iwasawa | G08B 13/187 |
| | | | | 340/557 |
| 2011/0167250 | A1* | 7/2011 | Dicks | A61B 5/1112 |
| | | | | 713/2 |
| 2011/0179405 | A1* | 7/2011 | Dicks | G06F 8/61 |
| | | | | 717/168 |
| 2012/0042380 | A1* | 2/2012 | Kohiyama | G06F 21/10 |
| | | | | 726/22 |
| 2012/0083315 | A1* | 4/2012 | Kawakishi | H04W 4/60 |
| | | | | 455/558 |
| 2012/0244908 | A1* | 9/2012 | Zheng | H04W 48/18 |
| | | | | 455/558 |
| 2015/0101475 | A1 | 4/2015 | Convent et al. | |
| 2015/0120496 | A1* | 4/2015 | Watson | G06F 3/147 |
| | | | | 705/26.8 |

FOREIGN PATENT DOCUMENTS

| | | |
|---|---|---|
| JP | H09-269812 A | 10/1997 |
| JP | 2002-215238 A | 7/2002 |
| JP | 2006-011816 A | 1/2006 |
| JP | 2008-082782 A | 4/2008 |
| JP | 2008-090539 A | 4/2008 |
| JP | 2009-194897 A | 8/2009 |
| JP | 2010-176283 A | 8/2010 |
| JP | 2011-210137 A | 10/2011 |
| JP | 2012-146056 A | 8/2012 |
| JP | 2012-174024 A | 9/2012 |
| JP | 2013-064671 A | 4/2013 |
| JP | 2013-96860 A | 5/2013 |
| JP | 2015-103186 A | 6/2015 |

OTHER PUBLICATIONS

May 1, 2018 International Preliminary Report on Patentability issued in International Patent Application No. PCT/JP2016/080928.
Jun. 4, 2019 Office Action issued in Japanese Patent Application No. 2015-210602.
May 21, 2019 Extended European Search Report issued in European Patent Application No. 16859653.4.

* cited by examiner

| COMMAND CODE | CONDITION CODE | SD MEMORY ADDRESS | AREA SENSOR ADDRESS | IDENTIFICATION CODE |
|---|---|---|---|---|
| WRITE | MONITORING AREA | ***** | ***** | 1,2,3,4,5 |
| WRITE | PARAMETER | ***** | ***** | 1,2,3,4,5 |
| WRITE | UPDATE PROGRAM | ***** | ***** | 1,2,3,4,5 |
| READ | MONITORING AREA | ***** | ***** | 6 |
| READ | HISTORY DATA | ***** | ***** | 6 |
| WRITE | UPDATE PROGRAM | ***** | ***** | 7,8,9 |
| ... | ... | ... | ... | ... |

AREA SENSOR AND EXTERNAL STORAGE DEVICE

FIELD OF THE INVENTION

The present invention relates to an area sensor including: a sensor unit that emits measurement light with which a monitoring area is scanned, and detects reflected light of the measurement light; and a system controller that controls the sensor unit to output sensor information to an external device, the sensor information including object information in the monitoring area obtained based on an output signal from the sensor unit.

DESCRIPTION OF THE RELATED ART

A sensor unit in an area sensor includes a distance measurement device employing Time of Flight (TOF) or amplitude modulation (AM). This sensor unit is controlled by a system controller.

The area sensor is used as various sensors including: a visual sensor for a robot and an automatic guided vehicle; an opening/closing sensor for a self-opening door; a monitoring sensor that detects whether something or someone has entered a monitoring target area; and a safety sensor for safely stopping a dangerous device when something or someone approaching the device is detected.

TOF is a method of calculating a distance between the area sensor and an object in the monitoring area based on a difference $\Delta t$ in detected time between measurement light, which is a pulsed laser beam output to the monitoring area, and reflected light that is the measurement light reflected on the object. Specifically, a distance D is calculated with the following formula $$D=\Delta t \cdot C/2,$$

where C represents the speed of light.

AM is a method including modulating an amplitude of the measurement light and calculating the distance between the area sensor and the object in the monitoring area based on a phase difference $\Delta \varphi$ between the measurement light output to the monitoring area and the reflected light that is the measurement light reflected by the object. Specifically, the distance D is calculated with the following formula $$D=\Delta \varphi \cdot C/(4\pi \cdot f),$$

where C represents the speed of light and f represents a modulation frequency.

Patent document 1 discloses an obstacle detection sensor attached to an automatic guided vehicle. This obstacle detection sensor attached to the automatic guided vehicle includes a distance measurement unit, a detection area registration unit, a used pattern setting unit, and a determination unit.

The distance measurement unit measures a distance to a detection object for each of predetermined angle ranges obtained by radially dividing a peripheral area. The detection area registration unit registers a plurality of patterns of detection areas defined by lines connecting a plurality of boundary points set in the measurement range of the distance measurement unit.

The used pattern setting unit selects and sets a pattern to be used from the patterns of a plurality of detection areas registered in the detection area registration unit, for each traveling section of the automatic guided vehicle. The determination unit outputs information indicating that an obstacle is detected while the automatic guided vehicle is travelling, when a distance to a detected object measured by the distance measurement unit for each predetermined angle range is within a detection area set to the current travelling section.

Patent document 2 discloses a method of acquiring laser scanner setting. In the method, data setting and measurement result of a laser scanner, in a laser measurement system using a laser beam, are remotely acquired.

This method of wirelessly acquiring laser scanner setting is implemented with a laser measurement device provided with a distance measurement unit. The laser measurement device includes a light emitting unit that emits a laser beam and a light receiving unit that receives reflected light of the laser beam. The distance measurement unit measures a distance to a measurement target object based on time difference between a light beam emitting timing and a reflected light receiving timing. The distance measurement unit transmits a measurement signal to a remote control device through wireless communications. The remote control device transmits a control signal to the laser measurement device through wireless communications. Thus, the remote control device acquires a result of the measurement by the laser measurement device, and signal setting of the laser measurement device is controlled.

PRIOR ART DOCUMENTS

Patent Documents

[Patent document 1] Japanese Unexamined Patent Application Publication No. 2002-215238

[Patent document 2] Japanese Unexamined Patent Application Publication No. 2013-96860

SUMMARY OF INVENTION

Problems to be Solved by the Invention

Registration of a detection area, that is, a monitoring area of the obstacle detection sensor described in Patent document 1 requires the following procedures. Specifically, before the registration is performed, dedicated monitoring area setting software is started on a personal computer and a plurality of monitoring areas are generated, and then the obstacle detection sensor and the personal computer are connected to each other through a communication line. Then, data, defining the monitoring area, generated by the personal computer is stored in a memory of the obstacle detection sensor.

This series of procedures including connecting the personal computer to the obstacle detection sensors and then setting the monitoring area for each of the sensors is extremely cumbersome.

A control program for the obstacle detection sensor may be updated or changed in the other like way after the obstacle detection sensor has been shipped. Then, a similar procedure involving a similar problem is required. Specifically, the personal computer needs to be connected to each of the obstacle detection sensors for updating and changing the control program stored in a flash read only memory (ROM) provided in the sensor.

The method of wirelessly acquiring laser scanner setting described in Patent document 2 requires no procedure of connecting the personal computer to each of the obstacle detection sensors but still requires cumbersome procedures. Specifically, a personal computer needs to be brought to an installed environment of the obstacle detection sensor in the first place, and a communication line needs to be established each time a personal computer is brought to set up, and then the data defining the monitoring area and the update program need to be transmitted.

The present invention is made in view of the above problems, and an object of the present invention is to provide an area sensor and an external storage device with which required information can be written and read to and from the area sensor without using a cumbrous device such as a personal computer.

Means for Solving the Problems

To achieve the above-described object, as set forth in claim 1, a first characteristic configuration of an area sensor according to the present invention is that the area sensor includes: a sensor unit that emits measurement light with which a monitoring area is scanned, and detects reflected light of the measurement light; and a system controller that controls the sensor unit to output sensor information to an external device, the sensor information including object information in the monitoring area obtained based on an output signal from the sensor unit. The system controller includes a memory interface to which a portable external storage device is connectable, a sensor controller that controls the sensor unit, and a memory controller that accesses the external storage device and a start processing unit which operates the memory controller in priority to the system controller, when the external storage device is connected to the memory interface.

When the portable external storage device is set to the memory interface, the external storage device and the area sensor can exchange data, with the memory controller of the system controller operating with priority over the sensor controller due to control performed by the start processing unit. The external storage device is portable and thus can be extremely easily carried to various installed environments of the area sensor. Furthermore, the external storage device can be detachably attached. Thus, usability can be largely improved.

As described in claim 2, a second characteristic configuration of the area sensor is that, in addition to the above-described first characteristic configuration, the memory controller is configured to execute authentication processing to compare an identification code stored in the external storage device to an identification code uniquely set to the area sensor.

The memory controller compares the identification code stored in the external storage device and the identification code uniquely set to the area sensor, to evaluate whether the external storage device is appropriate to the area sensor. Higher security can be achieved with required processing executed based on a result of the evaluation.

As described in claim 3, a third characteristic configuration of the area sensor is that, in addition to the above-described second characteristic configuration, the memory controller is configured to execute read processing and/or write processing based on a command stored in the external storage device, when the identification codes match in the authentication processing.

When the identification code stored in the external storage device and the identification code uniquely set to the area sensor match as a result of the comparison, the memory controller determines that an appropriate external storage device has been connected. Then, the read processing or the write processing is executed based on the command stored in the external storage device. Thus, with a required command stored in the external storage device in advance, the memory controller automatically executes processing required for the area sensor. As a result, the external storage device can be flexibly used.

As described in claim 4, a fourth characteristic configuration of the area sensor is that, in addition to the above-described second or third characteristic configuration, the memory controller is configured to execute read processing and/or write processing based on a command which is associated with the identification code and stored in the external storage device when the identification codes match in the authentication processing.

The command stored in the external storage device is associated with the identification code. Thus, processing unique to each identification code can be executed. In other words, processing unique to each of the area sensors to which the same external storage device is connected can be executed. As a result, the external storage device can be more flexibly used.

As described in claim 5, a fifth characteristic configuration of the area sensor is that, in addition to the above-described third or fourth characteristic configuration, the system controller includes a storage unit that is segmented into a program storage area storing therein an operation program of the area sensor and a data storage area storing therein information on the monitoring area, and a CPU that executes the program stored in the program storage area of the storage unit, the memory controller is implemented with the CPU, and the CPU executes an access program, for accessing the external storage device, in the program stored in the program storage area, and the memory controller executes read processing or write processing based on the command stored in the external storage device, the read processing including reading an update program from the external storage device and writing the update program to the program storage area or including reading control information from the external storage device and writing the control information to the data storage area, the write processing including reading, by the sensor controller, sensor information stored in the data storage area or reading control information stored in the data storage area and writing the sensor information or the control information to the external storage device.

The memory controller includes the access program, for accessing the external storage device, stored in the program storage area of the storage unit and the CPU that reads and executes the access program. When the command stored in the external storage device is the read command, the memory controller reads an update program from the external storage device and writes the update program to the program storage area, and reads control information and writes the control information to the data storage area. When the command stored in the external storage device is the write command, the memory controller reads the sensor information stored in the data storage area or the control information stored in the data storage area, and writes the sensor information or the control information to the external storage device. Thus, when the read processing is executed, the operation program of the area sensor is updated with the program stored in the external storage device, or the control information is set. When the write processing is executed, the sensor information or the control information stored in the storage unit of the area sensor is loaded into the external storage device.

As described in claim 6, a sixth characteristic configuration of the area sensor is that, in addition to the above-described fifth characteristic configuration, the control information includes any one of area information that defines the monitoring area, number of areas information that defines number of the monitoring areas, interlock information that holds sensor information output to the external device, restart information for automatically or manually resetting the sensor information output to the external device, and master-slave information that defines the area sensor to operate as master or slave upon being connected to a network.

When the read processing is executed, in the area sensor, the monitoring area is set if the control information is the area information, the number of monitoring areas is set if the control information is the number of areas information, the state where the object is detected in the monitoring area is maintained if the control information is the interlock information, and the state where the object is detected in the monitoring area is automatically or manually reset if the control information is the restart information. Specifically, when no object is detected in the monitoring area, the state where the object is detected is automatically reset or manually reset by an input operation using a switch or the like. If the control information is the master-slave information, each of the plurality of area sensors connected is set to operate as a master area sensor or a slave area sensor.

When the write processing is executed, the control information set to the area sensor is stored in the external storage device. For example, the control information stored in the external storage device is reused for other area sensors thereafter.

As described in claim 7, a seventh characteristic configuration of the area sensor is that, in addition to the above-described fifth or sixth characteristic configuration, the sensor information includes the output signal from the sensor unit and the object information in the monitoring area obtained based on the output signal.

The sensor information, stored in the data storage area and written to the external storage device, includes the output signal from the sensor unit and the object information in the monitoring area obtained based on the output signal. The sensor information is loaded as the history information.

As described in claim 8, a first characteristic configuration of an external storage device according to the present invention is that the external storage device is connected to the area sensor according to any one of the above-described first to seventh characteristic configurations and stores therein at least one identification code for identifying an area sensor to be a target of the write processing or the read processing, a write command or a read command associated with the at least one identification code, and data identifying information for identifying data to be a target of the write command or the read command.

As described in claim 9, a second characteristic configuration of the external storage device is that, in addition to the above-described first characteristic configuration, the external storage device includes any one of a portable SD memory, a USB memory, and a hard disk.

Effects of Invention

As described above, the present invention can provide an area sensor and an external storage device with which required information can be written and read to and from the area sensor without using a cumbrous device such as a personal computer.

DESCRIPTION OF THE PREFERRED EMBODIMENTS

An area sensor and an external storage device according to the present invention are described below.

Figure 1A:
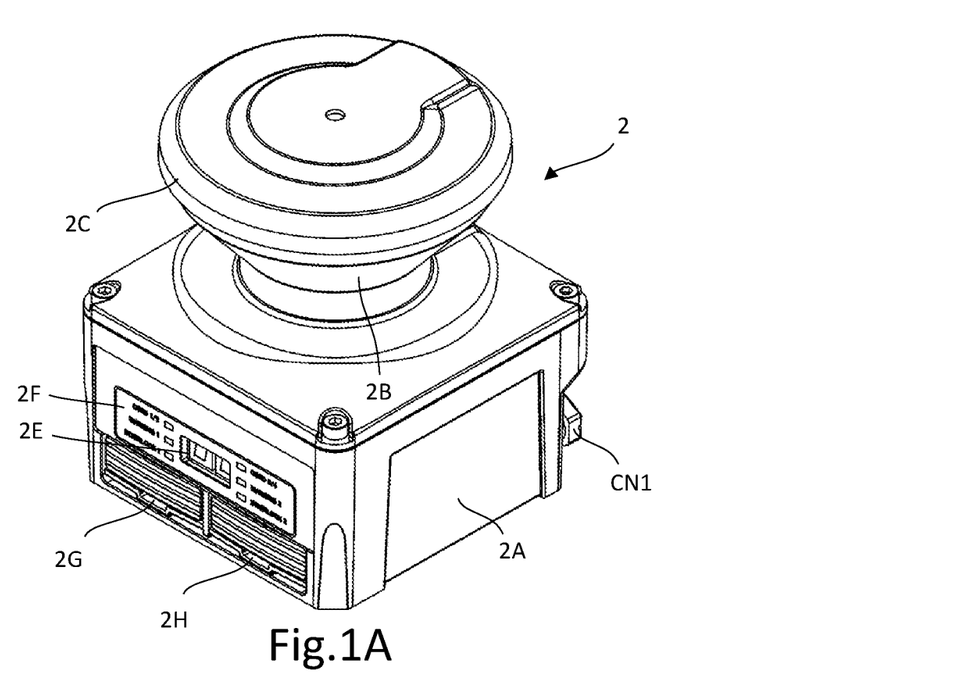
FIG. 1A is a perspective view of an area sensor according to the present invention and FIG. 1B is a side view of the same.
Figure 1B:
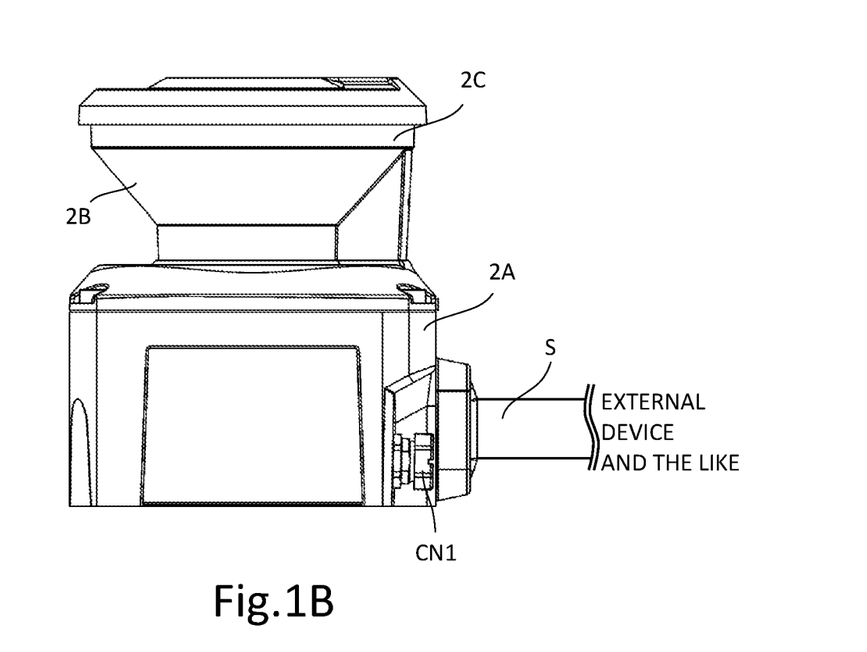
Figure 2:
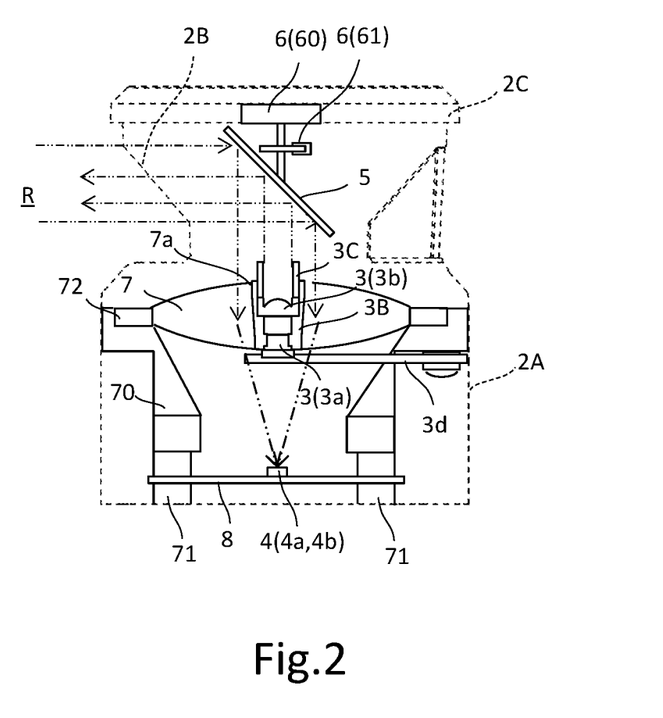
FIG. 2 is a diagram illustrating an internal structure of the area sensor.

FIGS. 1A and 1B are outer views of an area sensor 2 (hereinafter, also referred to as a laser sensor 2), and FIG. 2 illustrates an internal structure of the laser sensor 2. The present embodiment is described under a condition that the area sensor 2 is installed in a moving member such as an automatic guided vehicle (hereinafter, referred to as "AGV") to be used as a safety sensor that detects an obstacle on a traveling route. The AGV conveys materials and the like in a manufacturing site and the like.

As illustrated in FIGS. 1A and 1B, the laser sensor 2 includes a lower casing 2A having an approximately rectangular parallelepiped shape and an upper casing 2C including an optical window 2B having an inverted truncated conical shape. The lower casing 2A has a back surface provided with a communication connector CN1 for a local area network (LAN). An input/output cable S including a plurality of signal lines extends from the back surface.

The lower casing 2A has a front surface provided with a two-digit segment display unit 2E indicating an operation status of the area sensor 2 and a monitor display unit 2F including arrays of three light emitting diodes (LEDs) on left and right sides of the segment display unit 2E.

A secure digital (SD) card connector 2G and a universal serial bus (USB) connector 2H, each covered with an openable cover, are provided below the monitor display unit.

As illustrated in FIG. 2, the area sensor 2 includes a light emitting unit 3, a light receiving unit 4, a polarization mirror 5, a scanning mechanism 6, a light receiving lens 7, a control board 8, and the like.

The scanning mechanism 6 includes a motor 60 provided on an upper inner wall of the upper casing 2C and an encoder 61 that detects a rotation status of the motor 60. The polarization mirror 5 is rotatably attached to a rotation shaft while being inclined by an angle of 45° relative to the rotation shaft of the motor 60. The encoder 61 functions as a scanning angle detection unit for measurement light.

The light emitting unit 3 and the light receiving unit 4 are coaxially arranged with respect to the rotation shaft of the motor 60. The light emitting unit 3 includes a laser diode 3a for light with a wavelength in an infrared range and a light projecting lens 3b. The light receiving unit 4 includes a photodiode 4a and an amplifier circuit 4b, and is provided on the control board 8 in a bottom portion of the lower casing 2A.

The control board 8 is provided with a signal processing unit and a system controller. The signal processing unit controls driving of the motor 60 based on a signal from the encoder 61, controls the laser diode 3a to emit light at a predetermined timing, and processes a signal corresponding to light received by the light receiving unit 4. The system controller controls the area sensor 2.

The light receiving lens 7 has a circumference portion fixed to a flange portion 72 of a lens holder 70 having four leg portions 71. A tubular light projecting lens holder 3B is inserted to a cylindrical notch portion 7a formed at a portion corresponding to an optical-axis center of the light receiving lens 7. The light projecting lens 3b is provided in the light projecting lens holder 3B and is held by a lens holder 3C from above to be fixed.

The laser diode 3a is mounted on a rectangular substrate 3d on a lower end portion of the light projecting lens holder 3B. The substrate 3d has an end portion fixed to the flange portion 72 of the lens holder 70 with a bolt. The control board 8 is fixed by the four leg portions 71 of the lens holder 70.

Pulsed measurement light output, after beam forming by the light projecting lens 3b, from the light emitting unit 3 is incident on the polarization mirror 5. The measurement light is polarized and reflected by the polarization mirror 5, driven to be rotated by the motor 60, to pass through the optical window 2B. A monitoring area R is scanned with this measurement light.

The reflected light of the measurement light passes through the optical window 2B to be incident on the polarization mirror 5 and is then focused onto the light receiving unit 4 by the light receiving lens 7. The reflected light is converted into an electrical signal by the light receiving unit 4, to be input to the signal processing unit.

The light emitting unit 3, the, light receiving unit 4, the polarization mirror 5, the scanning mechanism 6, the light receiving lens 7, and the signal processing unit provided to the control board 8 described above forms a sensor unit 10. The sensor unit 10 scans the monitoring area R with the measurement light, and detects the reflected light of the measurement light.

Figure 4:
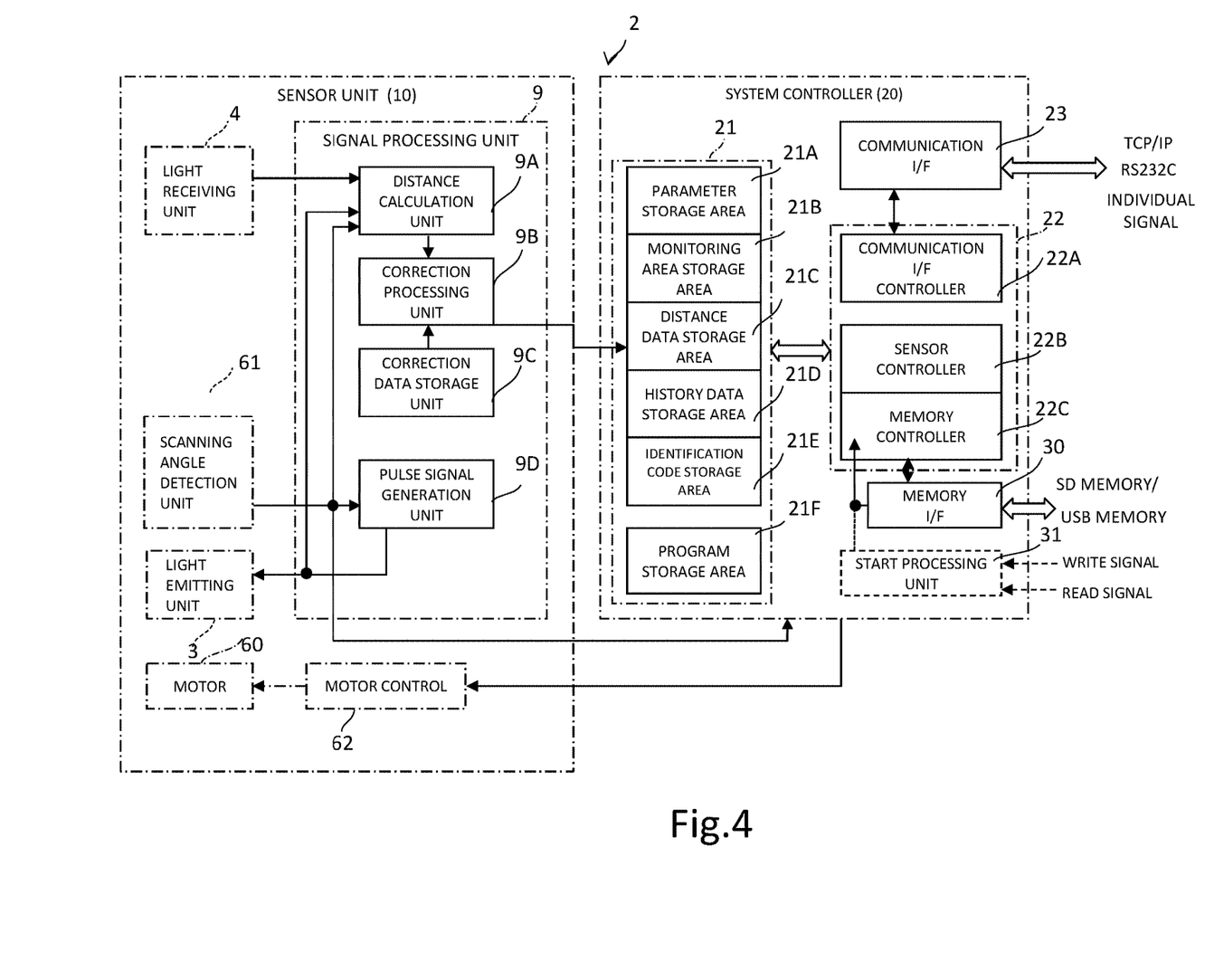
FIG. 4 is a diagram illustrating functional blocks of a sensor unit and a system controller of the area sensor.

FIG. 4 is a diagram illustrating functional blocks of the sensor unit 10 and the system controller 20. The signal processing unit 9 incorporated in the sensor unit 10 includes an arithmetic circuit such as a digital signal processor, and includes functional blocks including a distance calculation unit 9A, a correction processing unit 9B, a correction data storage unit 9C, and a pulse signal generation unit 9D The pulse signal generation unit 9D performs control in such a manner that the pulsed measurement light is output from the light emitting unit 3 at a predetermined interval to be synchronized with pulses from the encoder 61 serving as the scanning angle detection unit. The light receiving unit 4 receives reflected light that is the measurement light reflected by a surface of any object.

The distance calculation unit 9A calculates a distance between the area sensor 2 and a position where the measurement light has been reflected, based on delayed time between a measurement light output timing and a reflected light detection timing.

The correction processing unit 9B corrects the distance, calculated by the distance calculation unit 9A, based on correction data stored in the correction data storage unit 9C, and outputs the resultant distance data to the system controller 20.

The correction data is for correcting an error including: a production error of individual area sensor 2; and an error due to the response characteristics of the photodiode 4a used in the light receiving unit 4. The correction data is a value calculated based on measurement light emitted onto a reference reflector provided in the area sensor 2, and a timing at which reflected light of the measurement light is detected.

The system controller 20 includes a microcomputer incorporating a flash read only memory (ROM) and a peripheral circuit including a communication interface 23 (hereinafter, referred to as a "communication I/F") and a memory interface 30 (hereinafter, referred to as a "memory I/F"). The flash ROM serves as a storage unit 21 according to the present invention. Functional blocks 22, including the sensor controller 22B and the memory controller 22C according to the present invention, are implemented with a central processing unit (CPU) executing a program stored in the flash ROM.

The functional blocks 22 further include a communication I/F controller 22A that controls the communication I/F 23, in addition to the sensor controller 22B that controls the sensor unit 10 and the memory controller 22C that controls the memory interface 30.

The communication I/F 23 includes a signal input/output port, a serial signal port, and a LAN port. A plurality of input signal lines and output signal lines are connected to the signal input/output port. A communication line supporting RS485 is connected to the serial signal port. The LAN is for establishing network connection using a protocol such as Transmission Control Protocol/Internet Protocol (TCP/IP).

The input/output cable S in FIG. 1B is connected to the signal input/output port. A twisted pair communication line, supporting RS485, is provided as a part of the input/output cable S connected to the serial signal port. A LAN cable has a connector connected to the communication connector CN1 in FIG. 1B.

The memory interface 30 is for connecting a portable storage medium, and includes the SD card connector 2G and the USB connector 2H in FIG. 1A. In this example, a portable storage medium to be connected to the SD card connector 2G is an SD memory, and a portable storage medium connected to the USB connector 2H is a USB memory, a hard disk, or the like.

The storage unit 21 is segmented into a program storage area 21F and a data storage area (21A to 21E). The program storage area stores therein a sensor control program for causing the CPU to function as the sensor controller 22B, and a memory control program for causing the CPU to function as the memory controller 22C.

The data storage area is segmented into data storage areas including: a parameter storage area 21A storing therein a parameter for setting an operation mode of the area sensor 2; a monitoring area storage area 21B where a monitoring area of the area sensor 2 is set; a distance data storage area 21C storing therein distance data received from the sensor unit 10, that is, distance data for each predetermined scanning angle; a history data storage area 21D storing therein a history of sensor information output to an external device based on the distance data received from the sensor unit 10; and an identification code storage area 21E storing therein an identification code such as an ID and a serial number for uniquely identifying the area sensor.

The parameter storage area 21A stores therein information including: a number of areas information defining the number of monitoring areas; interlock information for holding the sensor information that has been output to the external device; restart information for automatically or manually resetting the sensor information that has been output to the external device; and master-slave information defining whether the area sensor operates as master or slave upon being connected to a network.

The monitoring area storage area 21B stores therein data defining an area monitored with the area sensor 2. The monitoring area is set in accordance with the number of areas information described above. For example, when the number of areas is two, two monitoring areas are set.

Figure 3:
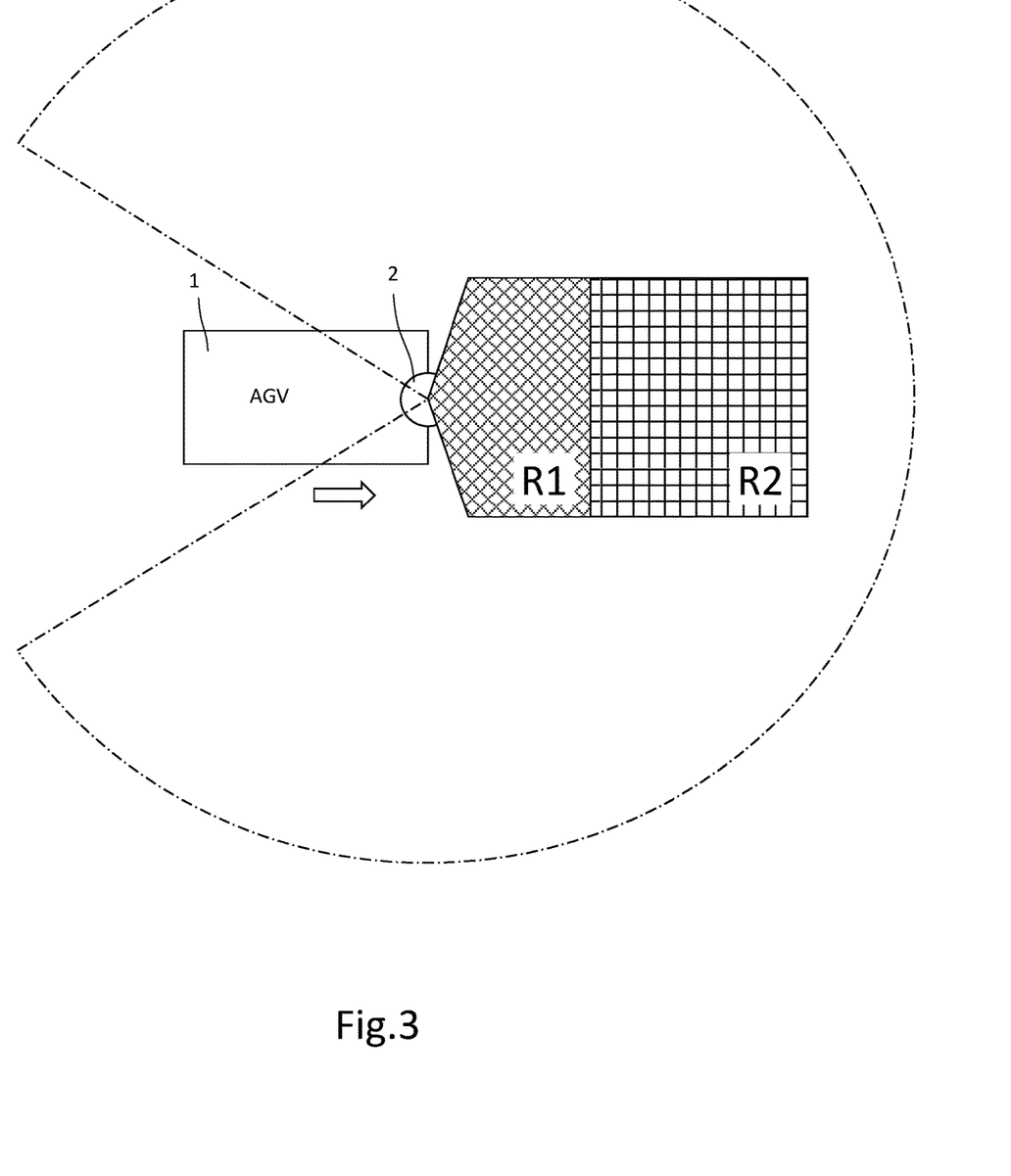
FIG. 3 is a diagram illustrating an example of a monitoring area.

FIG. 3 illustrates an example where the area sensor 2 installed in the AGV 1 has two monitoring areas R1 and R2 set, along the traveling direction of the AGV 1, for detecting whether there is an entering object such as a person or an obstacle. Specifically, the first monitoring area R1 is set to be close to the AGV 1 and the second monitoring area R2 is set to be adjacent to the first monitoring area R1 and to be farther from the AGV 1 than the first monitoring area R1 is. In FIG. 3, an area defined with a one-dot chain line is a detectable area of the area sensor 2, and the monitoring areas are set in this area.

For example, when the area sensor 2 detects an entering object, such as a person or an obstacle, in the second monitoring area R2, a warning signal is output to the controller of the AGV 1. Upon receiving the signal, the controller of the AGV 1 outputs a warning signal for emitting sound or light to prevent collision or performs control to decelerate and stop the AGV 1.

For example, when the area sensor 2 detects the entering object, such as a person or an obstacle, in the first monitoring area R1, an emergency stop signal is output to the controller of the AGV 1. Upon receiving the signal, the controller of the AGV 1 performs emergency stop control so that the AGV 1 immediately stops to be prevented from colliding with the entering object.

When the area sensor 2 starts, the sensor controller 22B controls driving of the motor control circuit 62, based on the encoder pulse received from the scanning angle detection unit 61, to achieve the constant rotation speed of the motor 60. Then, when the motor 60 starts up, the sensor controller 22B outputs an instruction to start distance measurement processing to the signal processing unit 9.

Upon receiving the distance data for each predetermined scanning angle from the signal processing unit 9, the sensor controller 22B determines whether each distance data indicates a position in a monitoring area set in the monitoring area storage area 21B. When the distance data indicates a position in the monitoring area, the sensor controller 22B outputs a required signal, such as the warning signal or the emergency stop signal, to the external device through the communication I/F 23, and stores the history of the signal output in the history data storage area 21E.

When the interlock information is set in the parameter storage area 21A, the state of outputting the emergency stop signal or the like is maintained even if no distance data indicating a position in the monitoring area is obtained by distance measurement thereafter.

In the parameter storage area 21A, the automatic restart information may be set with the interlock information not set. Under this condition, when no distance data indicating a position in the monitoring area is obtained by the distance measurement thereafter, the state of outputting the emergency stop signal or the like is reset. Furthermore, the manual restart information may be set. Under this condition, when no distance data indicating a position in the monitoring area is obtained by the distance measurement thereafter, the state of outputting the emergency stop signal or the like is reset at a timing when a reset signal is manually input through the communication I/F 23.

A plurality of the area sensors 2, connected to each other through a communication line supporting RS485, may be installed in the AGV 1. In this configuration, the area sensor 2 set to operate as the master in the parameter storage area 21A is connected to the controller of the AGV 1. The area sensor 2 set to operate as the master acquires the warning signal or the emergency stop signal, output from the other area sensor 2 set to operate as the slave, through the communication line, and outputs the acquired signal to the controller of the AGV 1.

The data such as the parameter stored in the parameter storage area 21A and the monitoring area stored in the monitoring area storage area 21B, is configured to be set and input with a personal computer connected to the communication connector CN1, under a normal condition.

A program stored in the program storage area 21F is updated with the program rewritten with the personal computer.

However, a configuration where the personal computer is connected to each of the area sensors 2 to set and input data requires extremely cumbersome procedures. Thus, the area sensor 2 according to the present invention is configured in such a manner that data can be set and read or a program can be updated via a portable external storage device.

When an SD memory, which is one example of the external storage device, is connected to the memory I/F 30, the memory I/F 30 outputs an interrupt signal to the CPU.

As a result, a state is established where the SD memory and the area sensor 2 can exchange data with the memory controller 22C operating with priority over the sensor controller 22B operating under the normal condition.

The memory controller 22C executes authentication processing of comparing an identification code stored in the SD memory and a unique identification code stored in the identification code storage area 21E of the area sensor 2. When the identification codes match, read processing and/or write processing is executed based on a command stored in the SD memory.

The SD memory stores therein in advance, data set in the parameter storage area 21A of the area sensor 2, monitoring area data set in the monitoring area storage area 21B, an update program for updating a program in the program storage area 21F, and the like. A data storage area is set in the SD memory. The data storage area stores therein distance data stored in the distance data storage area 21C and history data stored in the history data storage area 21D.

In the SD memory, a command code and a condition code are set in association with the identification code of each of the area sensors 2. The command code designates an operation to be performed including; writing data or an update program to the storage unit 21 of the area sensor 2; and reading data from the storage unit 21 of the area sensor 2. The condition code designates the type and location of write or read target data.

When the identification code set in the identification code storage area 21E is determined to be stored in the SD memory in the authentication process, the memory controller 22C determines that an appropriate SD memory is connected. Then, the memory controller 22C reads the command code and the condition code associated with the identification code, and automatically executes corresponding processing.

Specifically, when the SD memory stores therein the program read command, the memory controller 22C reads an update program from the SD memory, and writes the update program to the program storage area in the storage unit 21. When the SD memory stores therein the data read command, the memory controller 22C reads control information from the SD memory, and writes the control information to the data storage area.

When the SD memory stores therein the data write command, the memory controller 22C executes write processing of reading sensor information or control information stored in the storage unit 21, and writing the information to the SD memory.

Thus, with an SD memory attached to the individual area sensor 2, a monitoring area and a parameter required for the area sensor 2 can be set, and update processing can be executed for the control program.

From the area sensor 2 in which the monitoring area has been set, data for setting the monitoring area to the SD memory can be loaded, so that the data can be set to the other area sensor 2.

The memory controller 22C is not limited to a configuration of reading the command code and the condition code associated with the identification code and automatically executing the corresponding processing when it is determined that an appropriate SD memory is connected. Alternatively, the memory controller 22C may be configured to execute corresponding processing in accordance with an operation status of an external operation switch connected to a start processing unit 31. For example, in the example illustrated in FIG. 4, a configuration may be employed in which the write processing starts when a switch for inputting a write signal to the start processing unit 31 is operated, and the read processing starts when a switch for inputting a read signal is operated.

Figure 5:
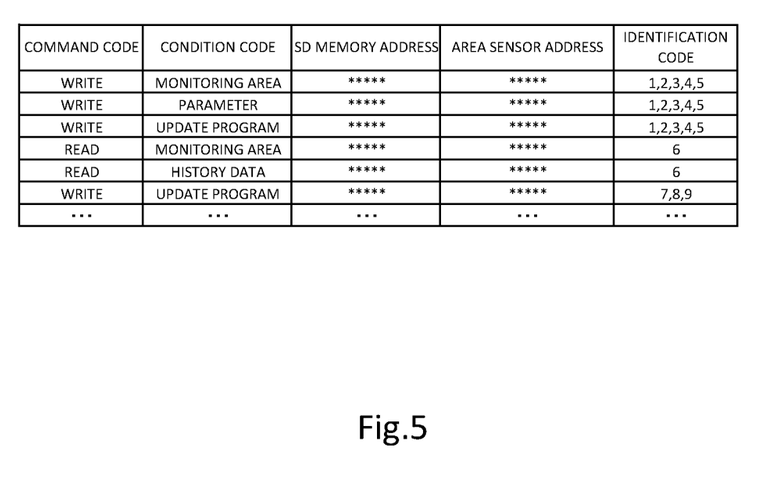
FIG. 5 is a diagram illustrating a data map stored in an external storage device.

FIG. 5 illustrates an exemplary data map of the command code, the condition code, the identification code, and the like stored in the SD memory.

For example, the map indicates that area sensors with identification codes 1 to 5 have the same monitoring area and the same parameter set and are updated with the same update program, that the monitoring area and the history data are loaded from an area sensor with an identification code 6, and that area sensors with identification codes 7 to 9 are updated with same update program.

Thus, the SD memory may store in advance required data including an identification code, a write or read command, a condition code indicating target data, and head storage addresses of the external storage device and the area sensor, so that the memory controller 22C can execute required processing on the area sensor 2. Thus, the SD memory can be flexibly used.

Figure 6:
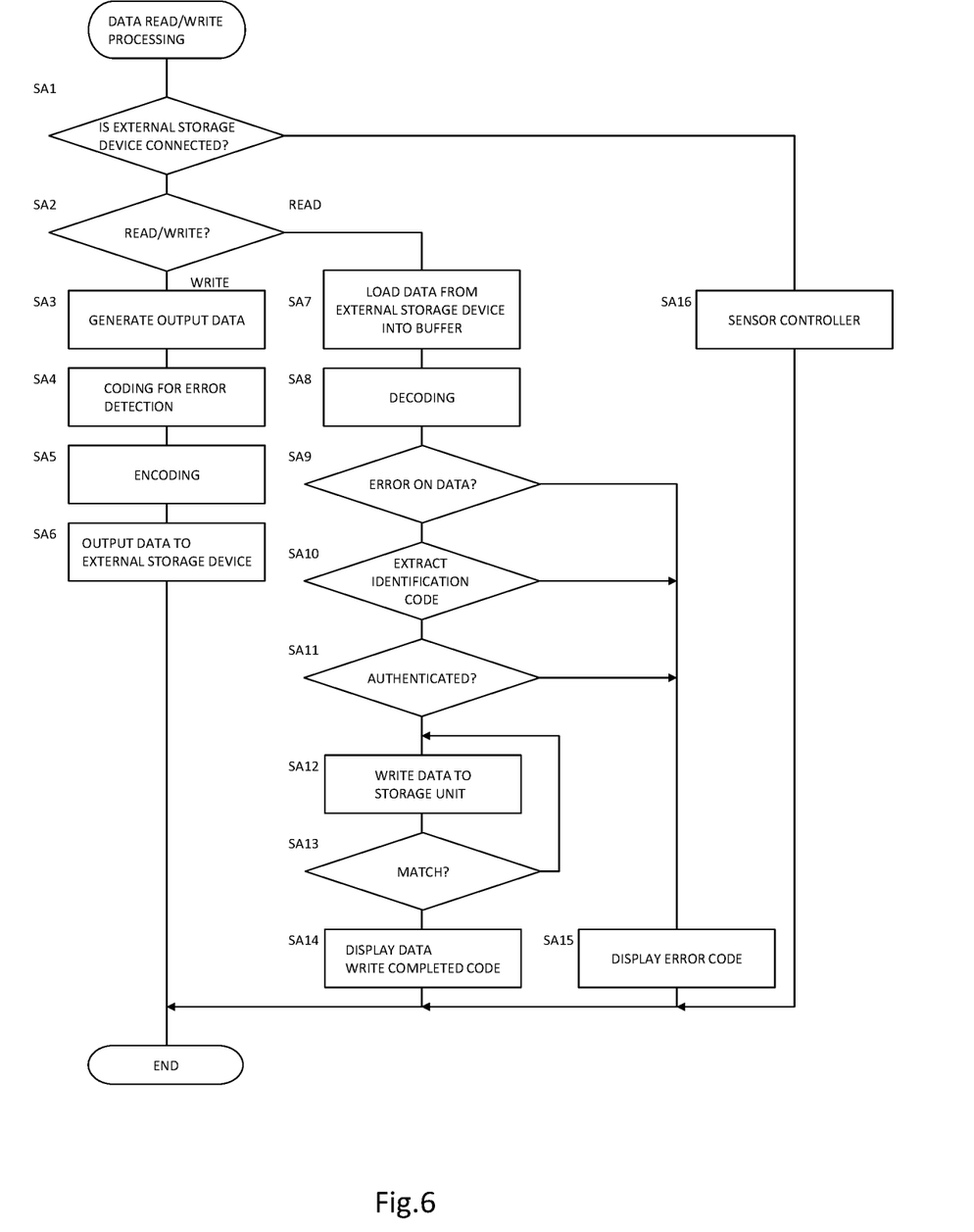
FIG. 6 is a flowchart illustrating processes for exchanging data between the external storage device and the area sensor.

FIG. 6 illustrates an example of a procedure of data read processing and data write processing executed between the external storage device and the area sensor.

When the external storage device is connected to the memory I/F 30 of the area sensor 2, a code indicating that the external storage device is connected is displayed on the segment display unit 2E (see FIG. 1A) of the lower casing 2A (SA1). Then, the memory controller 22C determines which one of the write signal (command) and a read signal (command) has been set and input from the start processing unit 31 (SA2).

When the write signal has been set and input, required data is read from the data storage area to generate output data (SA3), and coding processing for error detection is executed (SA4). Then, encoding processing is executed (SA5), and resultant data is output to the external storage device (SA6). The coding processing employed may be appropriate known technique including adding a Cyclic Redundancy Check (CRC) code, setting a parity bit, and the like.

When the read signal is determined to have been set and input in step SA2, the memory controller 22C loads data from the external storage device into a buffer (SA7), and then the data is decoded (SA8).

Then, error check is performed on the data (SA9). When the data is appropriate data, an identification code is extracted in the subsequent step (SA10). The identification code thus extracted is compared with the identification code stored in the identification code storage area (SA11).

When the codes match and thus the data is successfully authenticated (SA11), the data is written to the storage unit 21. Then, the data thus written is compared with the original data (SA13). When the data match the original data, a data write completed code is displayed on the segment display unit 2E (see FIG. 1A) (SA14).

When an error is found in the data in step SA9, the identification code is not extracted in step SA10, or the authentication fails in step SA11, an error code is displayed on the segment display unit 2E (see FIG. 1A) (SA15). Until the external storage device is determined to be connected in step SA1, the sensor controller 22B controls the sensor unit 10.

In the example described above, when the write signal is set and input, corresponding data is uniquely loaded into the external storage device, without authenticating the identification code. Alternatively, a configuration may be employed in which the authentication is performed on the identification code and then data to be loaded into the external storage device is checked, before being loaded into the external storage device.

Specifically, the system controller 20 includes the storage unit 21 and a CPU. The storage unit 21 is segmented into the program storage area 21F that stores therein an operation program for the area sensor 2 and the data storage areas 21A to 21D that store therein information related to the monitoring area. The CPU executes the program stored in the program storage area 21F of the storage unit 21. The memory controller 22C includes an access program for accessing the external storage device, which is one of the programs stored in the program storage area 21F, and a CPU that executes the access program.

Then, based on a command stored in the external storage device, the memory controller 22C executes read processing of reading an update program from the external storage device and writing the update program to the program storage area 21F or reading control information from the external storage device and writing the control information to the data storage areas 21A and 21B. Alternatively, the sensor controller 22B executes write processing of reading the sensor information stored in the data storage areas 21C and 21D or reading the control information stored in the data storage areas 21A and 21B, and writing the information thus read to the external storage device.

The external storage device according to the present invention is connected to the area sensor 2, and stores therein one or a plurality of identification codes, a write command or a read command corresponding to each identification code, and data identification information for identifying data that is a target of the write command or the read command. The identification code is for identifying the area sensor 2 that is a target of the write processing or the read processing.

In the example described above, a portable SD memory is used as the external storage device. Alternatively, any appropriate portable storage device such as a portable semiconductor memory including a USB memory and a hard disk and a storage such as a magnetic disk may be employed.

In the exemplary embodiment described above, the memory interface 30 and the start processing unit 31 are accommodated in the lower casing 2A of the laser sensor 2. Alternatively, the memory interface 30 and/or the start processing unit 31 may be formed separately from the laser sensor 2.

Figure 7:
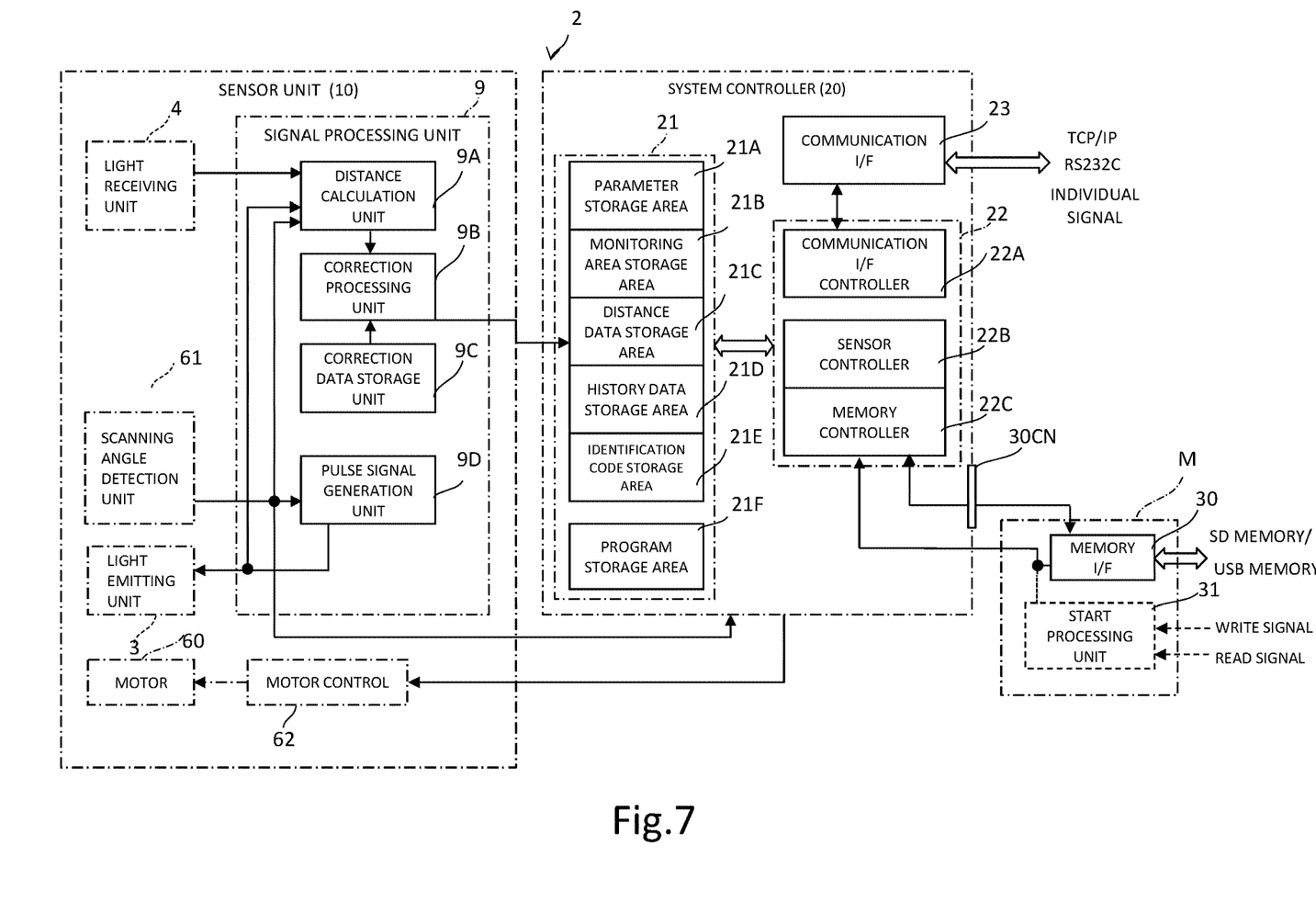
FIG. 7 is a diagram illustrating functional blocks of a sensor unit and a system controller according to another embodiment.

As illustrated in FIG. 7, the memory interface 30 and the start processing unit 31 may be formed separately from the laser sensor 2, and may be formed as an external module M that can be connected to the laser sensor 2 through a connector 30CN to which a signal line for interface is connected.

The embodiment described above is merely an example of an area sensor and an external storage device according to the present invention. A specific structure of the laser sensor, and a specific circuit configuration of the signal processing unit and the system controller can be modified as appropriate as long as the advantageous effect of the present invention can be obtained. Thus, the technical scope of the present invention is not limited to the examples described above.

The invention claimed is:

1. An area sensor comprising:
   a sensor in which a distance measurement device is incorporated, the sensor with the distance measurement device measuring a distance by emitting a measurement light with which a monitoring area is scanned and detecting a reflected light of the measurement light;
   a memory interface for connecting a removable external storage device;
   a communication interface which outputs a signal to an external device different from the removable external storage device; and
   a processor programmed to:
      control the sensor to output sensor information to the external device through the communication interface, the sensor information including object information in the monitoring area obtained based on an output signal from the sensor; and
      in response to determining that the removable external storage device is connected to the memory interface, execute authentication processing by comparing an identification code stored in the removable external storage device and an identification code uniquely set to the area sensor; and
      access the removable external storage device, such that data exchange via the memory interface of the area sensor takes priority over data exchange via the communication interface of the area sensor.

2. The area sensor according to claim 1, wherein:
   in response to determining that the removable external storage device is connected to the memory interface, the memory interface automatically outputs an interrupt signal to the processor of the area sensor; and
   in response to the interrupt signal, an operation over the memory interface is processed in priority to an operation over the communication interface in normal condition.

3. The area sensor according to claim 2, wherein the processor is programmed to:
   execute a read processing and/or a write processing based on a command which is (i) associated with the identification code uniquely set to the area sensor and (ii) stored in the removable external storage device, when the identification code uniquely set to the area sensor matches the identification code stored in the removable external storage device in the authentication processing.

4. The area sensor according to claim 1, wherein the processor is programmed to:
   execute a read processing and/or a write processing based on a command which is (i) associated with the identification code uniquely set to the area sensor and (ii) stored in the removable external storage device, when the identification code uniquely set to the area sensor matches the identification code stored in the removable external storage device in the authentication processing.

5. The removable external storage device connected to the area sensor according to claim 1, the removable external storage device storing therein:
   at least one identification code for identifying an area sensor to be a target of the write processing or the read processing,
   a write command or a read command associated with the at least one identification code, and
   data identifying information for identifying data to be a target of the write command or the read command.

6. The removable external storage device according to claim 5, wherein the removable external storage device includes any one of a removable SD memory, a USB memory, and a hard disk.

7. The area sensor according to claim 1, wherein:
   the processor of the area sensor updates the monitoring area that is to be scanned with the measurement light based on the data exchange via the memory interface; and
   the monitoring area and parameters for scanning the monitoring area are reset according to a command stored in the removable external storage device.

8. The area sensor according to claim 1, wherein the sensor information is output to the external device at a timing determined based on a command stored in the removable external storage device.

9. The area sensor according to claim 1, wherein the external device is at least one of a robot and an automatic guided vehicle.

10. The area sensor according to claim 1, wherein a program executed by the processor of the area sensor is updated by connecting the removable external storage device to the memory interface without connecting a personal computer.

11. The area sensor according to claim 1, wherein the removable external storage device stores a command for the area sensor and a condition associated with the command, the condition designating a type and a location of a target data on which an operation designated by the command is to be performed.

12. The area sensor according to claim 1, wherein:
    the removable external storage device stores a command for the area sensor; and
    the command resets the monitoring area that is scanned with the measurement light.

13. An area sensor comprising:
    a sensor that emits measurement light with which a monitoring area is scanned, and detects reflected light of the measurement light;
    a memory interface for connecting a removable external storage device; and
    a processor programmed to:
       control the sensor to output sensor information to an external device, the sensor information including object information in the monitoring area obtained based on an output signal from the sensor;
       access the external storage device to execute authentication processing to compare an identification code stored in the external storage device to an identification code uniquely set to the area sensor, and to execute read processing and/or write processing based on a command which is (i) associated with the identification code uniquely set to the area sensor and (ii) stored in the external storage device, when the identification code uniquely set to the area sensor matches the identification code stored in the external storage device in the authentication processing;

execute a program stored in a program storage area of a storage unit inside the area sensor, the storage unit being segmented into the program storage area storing therein an operation program of the area sensor and a data storage area storing therein information on the monitoring area;

execute an access program, for accessing the external storage device, in the program stored in the program storage area; and execute the read processing and/or the write processing based on the command stored in the external storage device, the read processing including:
  reading an update program from the external storage device and writing the update program to the program storage area, or
  reading control information from the external storage device and writing the control information to the data storage area, the write processing including:
  reading sensor information stored in the data storage area of the storage unit and writing the sensor information to the external storage device, or
  reading control information stored in the data storage area of the storage unit and writing the control information to the external storage device.

14. The area sensor according to claim 13, wherein the control information includes any one of
  area information that defines the monitoring area,
  number of areas information that defines number of the monitoring areas,
  interlock information that holds sensor information output to the external device,
  restart information for automatically or manually resetting the sensor information output to the external device, and
  master-slave information that defines the area sensor to operate as master or slave upon being connected to a network.

15. The area sensor according to claim 13, wherein the sensor information includes the output signal from the sensor and the object information in the monitoring area obtained based on the output signal.

16. The area sensor according to claim 13, wherein:
the control information includes any one of
  area information that defines the monitoring area,
  number of areas information that defines number of the monitoring areas,
  interlock information that holds sensor information output to the external device,
  restart information for automatically or manually resetting the sensor information output to the external device, and
  master-slave information that defines the area sensor to operate as master or slave upon being connected to a network; and
the sensor information includes the output signal from the sensor and the object information in the monitoring area obtained based on the output signal.

* * * * *